(12) United States Patent
Fukui

(10) Patent No.: US 12,055,424 B2
(45) Date of Patent: Aug. 6, 2024

(54) POWDER SUPPLY APPARATUS

(71) Applicant: HITACHI ZOSEN CORPORATION, Osaka (JP)

(72) Inventor: Hideyuki Fukui, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 263 days.

(21) Appl. No.: 17/630,183

(22) PCT Filed: Sep. 15, 2020

(86) PCT No.: PCT/JP2020/034838
§ 371 (c)(1),
(2) Date: Jan. 26, 2022

(87) PCT Pub. No.: WO2021/054310
PCT Pub. Date: Mar. 25, 2021

(65) Prior Publication Data
US 2022/0268616 A1    Aug. 25, 2022

(30) Foreign Application Priority Data

Sep. 20, 2019    (JP) .................................. 2019-170951

(51) Int. Cl.
*G01F 11/10*    (2006.01)
*G01F 11/26*    (2006.01)

(52) U.S. Cl.
CPC .................................. *G01F 11/261* (2013.01)

(58) Field of Classification Search
CPC .......... G01F 11/24; G01F 11/16; G01F 11/18; G01F 11/261; G01F 11/40; G01F 11/46; B65G 53/4633

(Continued)

(56) References Cited

U.S. PATENT DOCUMENTS 2,856,807 A  *  10/1958  Stutzman ................ G01F 11/24
                                                                    86/31
3,201,001 A  *  8/1965  Roberts ................... G01F 11/24
                                                                    406/135
(Continued)

FOREIGN PATENT DOCUMENTS

CN    1306228 A    8/2001
EP    1881376 B1   7/2009
(Continued)

OTHER PUBLICATIONS

Extended European Search Report dated Oct. 5, 2023, issued in corresponding European Patent Application No. 20864614.1 (8 pgs.).

(Continued)

*Primary Examiner* — Charles P. Cheyney
(74) *Attorney, Agent, or Firm* — Pillsbury Winthrop Shaw Pittman, LLP

(57) ABSTRACT

A powder supply apparatus includes a measuring shaft having a recess to be filled with powder, and a powder filling mechanism for filling the recess of the measuring shaft with the powder. The powder supply apparatus includes a rotary cylinder for sliding the measuring shaft along an axis of the measuring shaft, and a distal-end cover plate of a cylinder where the powder in the recess is leveled off by a slide of the measuring shaft. The rotary cylinder directs the recess downward by rotating the measuring shaft about the axis of the measuring shaft and supplies the leveled powder in the recess downward from the recess to a lifting plate at a predetermined position by dropping the powder.

8 Claims, 8 Drawing Sheets

(58) Field of Classification Search
USPC .................................................. 222/361–368
See application file for complete search history.

(56) References Cited

U.S. PATENT DOCUMENTS

| | | | |
|---|---|---|---|
| 3,446,404 A | 5/1969 | Mehta | |
| 4,108,337 A * | 8/1978 | Iijima | B29C 45/1816 222/363 |
| 4,321,115 A * | 3/1982 | Rebmann | G01F 11/24 204/245 |
| 4,528,848 A * | 7/1985 | Hafner | G01G 11/12 110/101 CC |
| 4,635,829 A | 1/1987 | Brittingham, Jr. | |
| 4,669,318 A * | 6/1987 | Angstrom | G01M 17/0072 73/862.14 |
| 4,751,948 A * | 6/1988 | Hertig | G01F 11/24 141/93 |
| 4,828,145 A * | 5/1989 | Raufast | B65G 53/4633 222/197 |
| 4,890,535 A * | 1/1990 | Bieber | G01F 11/12 86/33 |
| 5,050,781 A * | 9/1991 | Cloup | C02F 1/686 222/361 |
| 6,470,163 B1 | 10/2002 | Minagawa | |
| 9,296,502 B1 * | 3/2016 | Hollander | G01F 11/46 |
| 2013/0248563 A1 | 9/2013 | Baker et al. | |

FOREIGN PATENT DOCUMENTS

| | | |
|---|---|---|
| EP | 2318164 B1 | 12/2013 |
| ES | 2443298 T3 | 2/2014 |
| JP | 53-150714 U | 11/1978 |
| JP | 59-206717 A | 11/1984 |
| JP | 60-102623 U1 | 7/1985 |
| JP | 07-025929 U | 5/1995 |
| JP | 2599220 Y2 | 8/1999 |
| JP | 2000-266643 A | 9/2000 |
| JP | 3220431 B | 10/2001 |
| JP | 2014-061913 A | 4/2014 |
| JP | 2016-147253 A | 8/2016 |
| JP | 2016-204131 A | 12/2016 |
| KR | 10-1523437 B1 | 5/2015 |
| WO | 2015/008348 A1 | 1/2015 |

OTHER PUBLICATIONS

International Search Report dated Nov. 2, 2020, issued in corresponding International Patent Application No. PCT/JP2020/034838 w/English translation (6 pgs.).

* cited by examiner

POWDER SUPPLY APPARATUS

CROSS-REFERENCE TO RELATED APPLICATIONS

This application claims priority to International Patent Application No. PCT/JP2020/034838, filed Sep. 15, 2020, which claims priority to Japanese Patent Application No. 2019-170951, filed Sep. 20, 2019, the entire contents of each of which are incorporated herein by reference.

TECHNICAL FIELD

The present invention relates to a powder supply apparatus.

BACKGROUND ART

Solid materials obtained by applying a high pressure to evenly spread powder have been recently used for industrial application. Such solid materials typically need, for example, highly accurate shapes. Thus, a constant amount of powder is necessary for forming the solid materials. Hence, apparatuses for supplying powder (powder supply apparatuses) as uniformly as possible are used for apparatuses for forming the solid materials.

Japanese Patent Laid-Open No. 2016-147253 (hereinafter will be referred to as Patent Literature 1) proposes a conventional powder supply apparatus that securely supplies powder by dropping the powder from a measuring recess of a rod-like member. The powder supply apparatus described in Patent Literature 1 discharges air from the measuring recess, thereby securely dropping powder from the measuring recess.

SUMMARY OF INVENTION

Technical Problem

In the powder supply apparatus described in Patent Literature 1, powder in the measuring recess of the rod-like member is dropped and supplied therefrom by rotating the rod-like member about the axis 180° at an original position of the rod-like member. Hence, if powder with low flowability is used in the powder supply apparatus described in Patent Literature 1, the powder may be supplied from the measuring recess before the measuring recess is filled with a fixed amount of the powder. Moreover, powder having small particle diameters may adhere to a portion other than the measuring recess of the rod-like member by, for example, the powder entering between the rod-like member and a sliding contact portion, and the powder adhering to the rod-like member may be supplied together with the powder in the measuring recess. If a trace amount of powder less than 1.0 gf [$9.8 \times 10^{-3}$ N] is supplied, a small increase or decrease in the weight of the powder to be supplied may account for a large proportion of the powder to be supplied. This may lead to difficulty in supplying a fixed amount of powder.

Furthermore, in the powder supply apparatus described in Patent Literature 1, various configurations such as a powder agitation mechanism 50 and a hopper unit 21 for filling a measuring recess 34 with powder are required above a predetermined position for supplying powder, as illustrated in FIG. 1 of Patent Literature 1. A space above the predetermined position for supplying powder is necessary for a downstream process (e.g., a process for spreading powder) of the powder supply apparatus. The absence of such a space may limit apparatuses to be used in the downstream process.

Hence, an object of present invention is to provide a powder supply apparatus that can supply even a fixed trace amount of powder and secure a space above a predetermined position for supplying powder.

Solution to Problem

In order to solve the problem, a powder supply apparatus according to a first invention includes:
 a measuring shaft having a recess to be filled with powder;
 a powder filling mechanism for filling the recess of the measuring shaft with the powder;
 a slide mechanism for sliding the measuring shaft along an axis of the measuring shaft;
 a leveling member for leveling off the powder in the recess by a slide of the measuring shaft; and
 an axial rotation mechanism that directs the recess downward by rotating the measuring shaft about the axis of the measuring shaft and supplies the leveled powder in the recess downward from the recess by dropping the powder.

A powder supply apparatus according to a second invention, wherein the powder filling mechanism in the powder supply apparatus according to the first invention includes:
 a cylinder in which at least the recess of the measuring shaft is allowed to be placed and the powder is disposed; and
 a cylinder rotation mechanism that rotates the cylinder so as to agitate the powder in the cylinder and fill the recess with the powder.

A powder supply apparatus according to a third invention, wherein the powder filling mechanism in the powder supply apparatus according to the second invention further includes a powder agitator blade projecting from the inner surface of the cylinder.

Furthermore, a powder supply apparatus according to a fourth invention, wherein the powder filling mechanism in the powder supply apparatus according to one of the second and third inventions further includes an air blowing unit that agitates the powder by blowing air in the cylinder.

A powder supply apparatus according to a fifth invention, wherein the leveling member in the powder supply apparatus according to one of the second and third inventions is a member having a shaft through hole for guiding the recess of the measuring shaft from the inside to the outside of the cylinder by the slide of the measuring shaft.

A powder supply apparatus according to a sixth invention, in the powder supply apparatus according to any one of the first to third inventions, further includes a shaft vibration mechanism for facilitating the drop of the powder from the recess facing downward by vibrations.

A powder supply apparatus according to a seventh invention includes, in the powder supply apparatus according to any one of the first to third inventions, a detector for detecting a filling state of the powder in the recess after the powder is leveled off by the leveling member; and
 a control mechanism that causes the slide mechanism to slide the measuring shaft to a position for filling the recess with the powder and causes the powder filling mechanism to fill the recess with the powder if the detector detects an insufficient filling state of the powder.

Advantageous Effects of Invention

The powder supply apparatus supplies powder leveled off by the leveling member, so that even a fixed trace amount of the powder can be supplied. Moreover, the powder is supplied from the recess after being slid from a position for filling the recess with the powder, thereby securing a space above the predetermined position for supplying the powder.

DESCRIPTION OF EMBODIMENT

A powder supply apparatus according to an embodiment of the present invention will be described below in accordance with the accompanying drawings.

Figure 1:
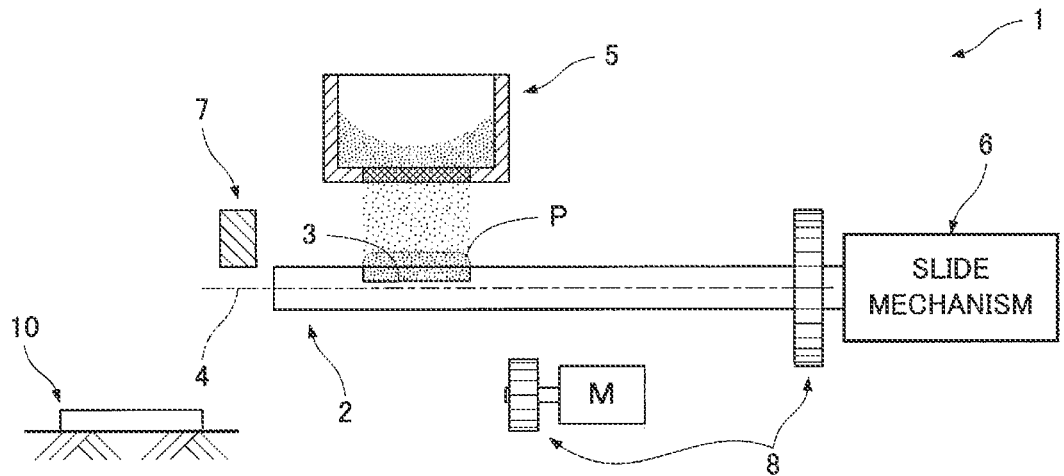
FIG. 1 is a schematic side view illustrating a powder supply apparatus according to an embodiment of the present invention, in which a recess of a measuring shaft is filled with powder.
Figure 2:
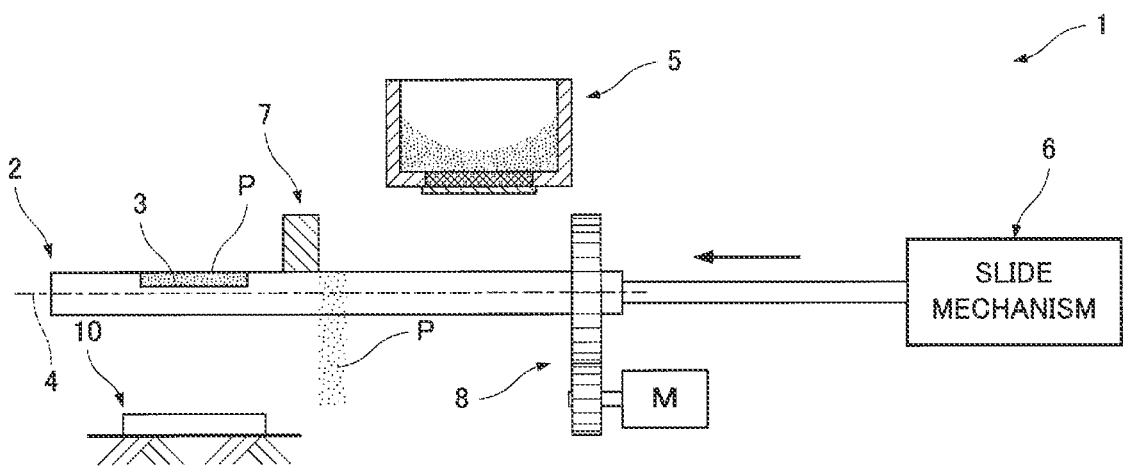
FIG. 2 is a schematic side view illustrating the powder supply apparatus, in which the powder in the recess is leveled off.
Figure 3:
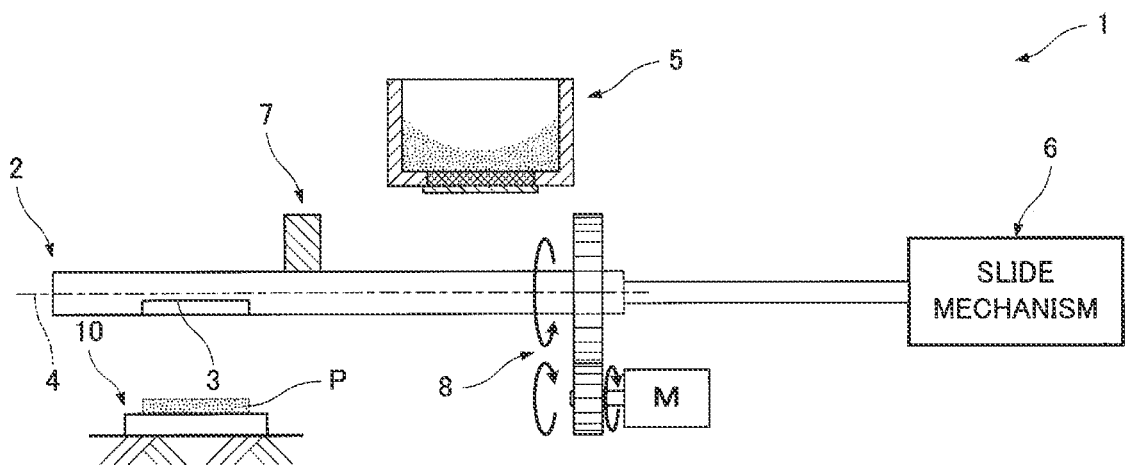
FIG. 3 is a schematic side view illustrating the powder supply apparatus, in which the leveled powder in the recess is supplied downward due to a drop of the powder.

First, referring to FIGS. 1 to 3, the powder supply apparatus will be schematically described below. FIGS. 1 to 3 are schematic side views of the powder supply apparatus.

As illustrated in FIG. 1, a powder supply apparatus 1 includes a measuring shaft 2 having a recess 3 to be filled with powder P, and a powder filling mechanism 5 for filling the recess 3 of the measuring shaft 2 with the powder P. As illustrated in FIG. 2, the powder supply apparatus 1 includes a slide mechanism 6 for sliding the measuring shaft 2 along an axis 4 of the measuring shaft 2, and a leveling member 7 for leveling off the powder P in the recess 3 by a slide of the measuring shaft 2. Furthermore, as illustrated in FIG. 3, the powder supply apparatus 1 includes an axial rotation mechanism 8 that directs the recess 3 downward by rotating the measuring shaft 2 about the axis 4 and supplies the leveled powder P in the recess 3 downward from the recess 3 to a predetermined position 10 by dropping the powder P.

First, in a method of using the powder supply apparatus 1, the powder filling mechanism 5 fills the recess 3 of the measuring shaft 2 with the powder P as illustrated in FIG. 1. The powder P in the recess 3 may protrude from the recess 3. Subsequently, as illustrated in FIG. 2, the slide mechanism 6 slides the measuring shaft 2, causing the leveling member 7 to level off the powder P in the recess 3. The leveling causes a protruding portion of the powder P from the recess 3 to drop from the recess 3. Thereafter, as illustrated in FIG. 3, the axial rotation mechanism 8 rotates the measuring shaft 2 about the axis 4 so as to direct the recess 3 downward. The powder P drops downward from the recess 3 facing downward, so that the powder P is supplied to the predetermined position 10 below the recess 3.

Figure 4:
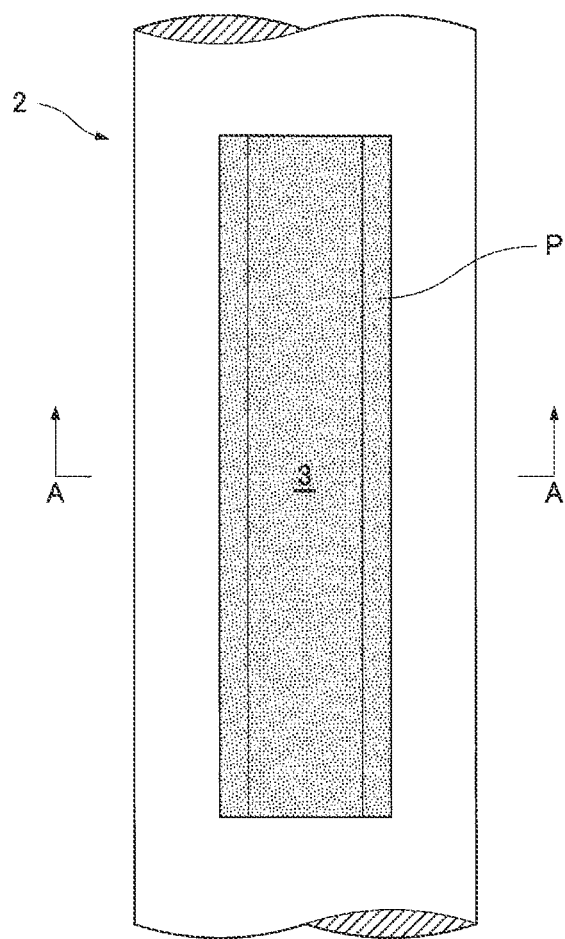
FIG. 4 is a plan view of the measuring shaft.
Figure 5:
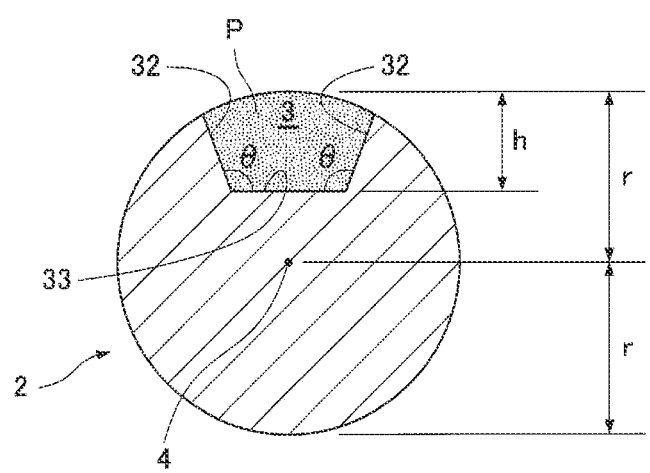
FIG. 5 is a cross-sectional view taken along line A-A of FIG. 4.
Figure 6:
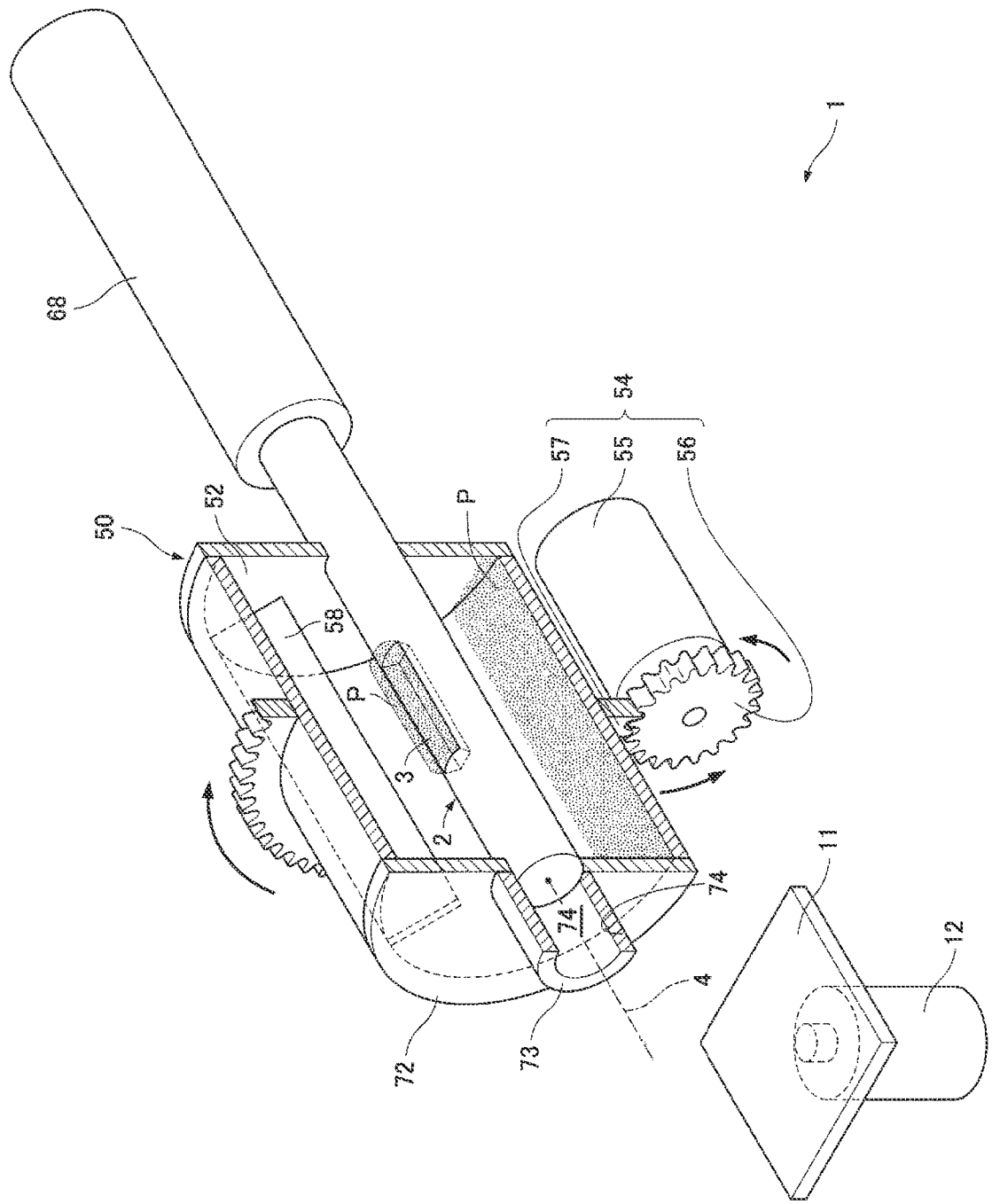
FIG. 6 is a partially cut perspective view illustrating the powder supply apparatus, in which the powder in the recess is leveled off.
Figure 7:
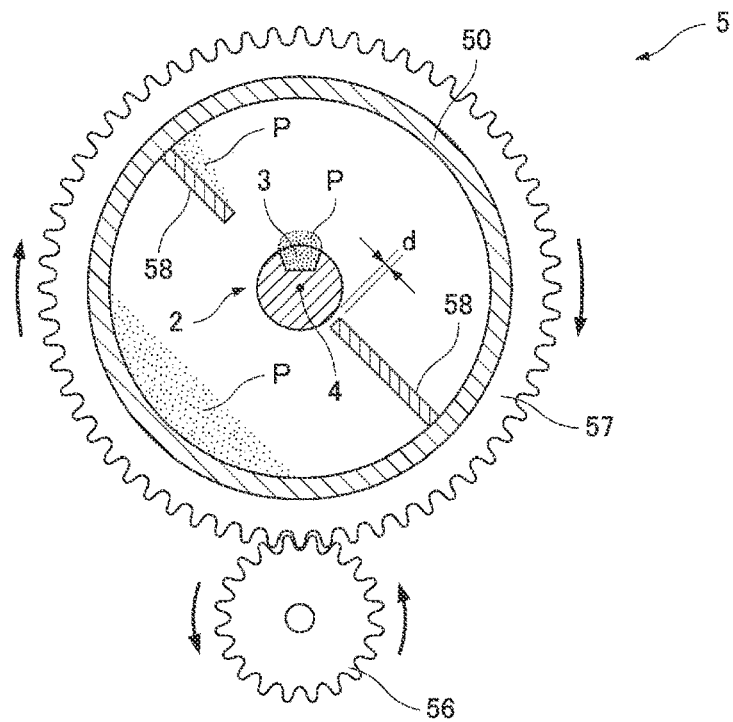
FIG. 7 is a cross-sectional view illustrating a cylinder constituting a powder filling mechanism for the powder supply apparatus.
Figure 8:
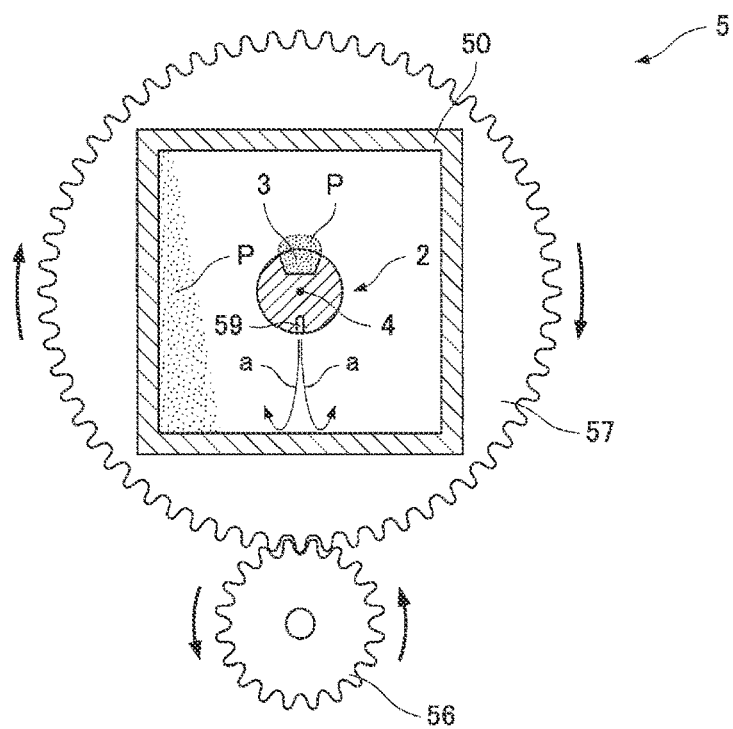
FIG. 8 is a cross-sectional view illustrating a modification of the cylinder.
Figure 9:
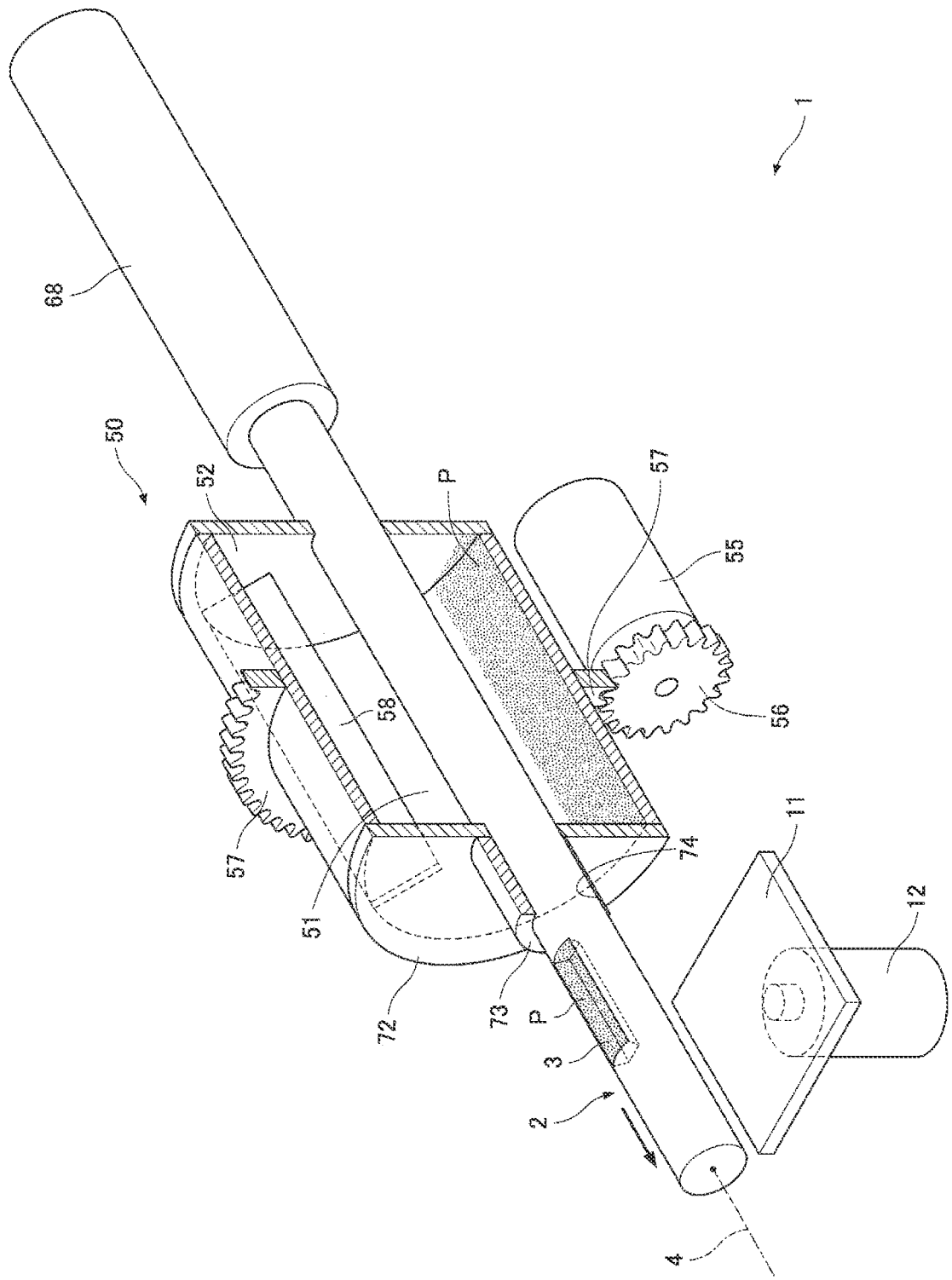
FIG. 9 is a partially cut perspective view illustrating the powder supply apparatus, in which the powder in the recess is leveled off.
Figure 10:
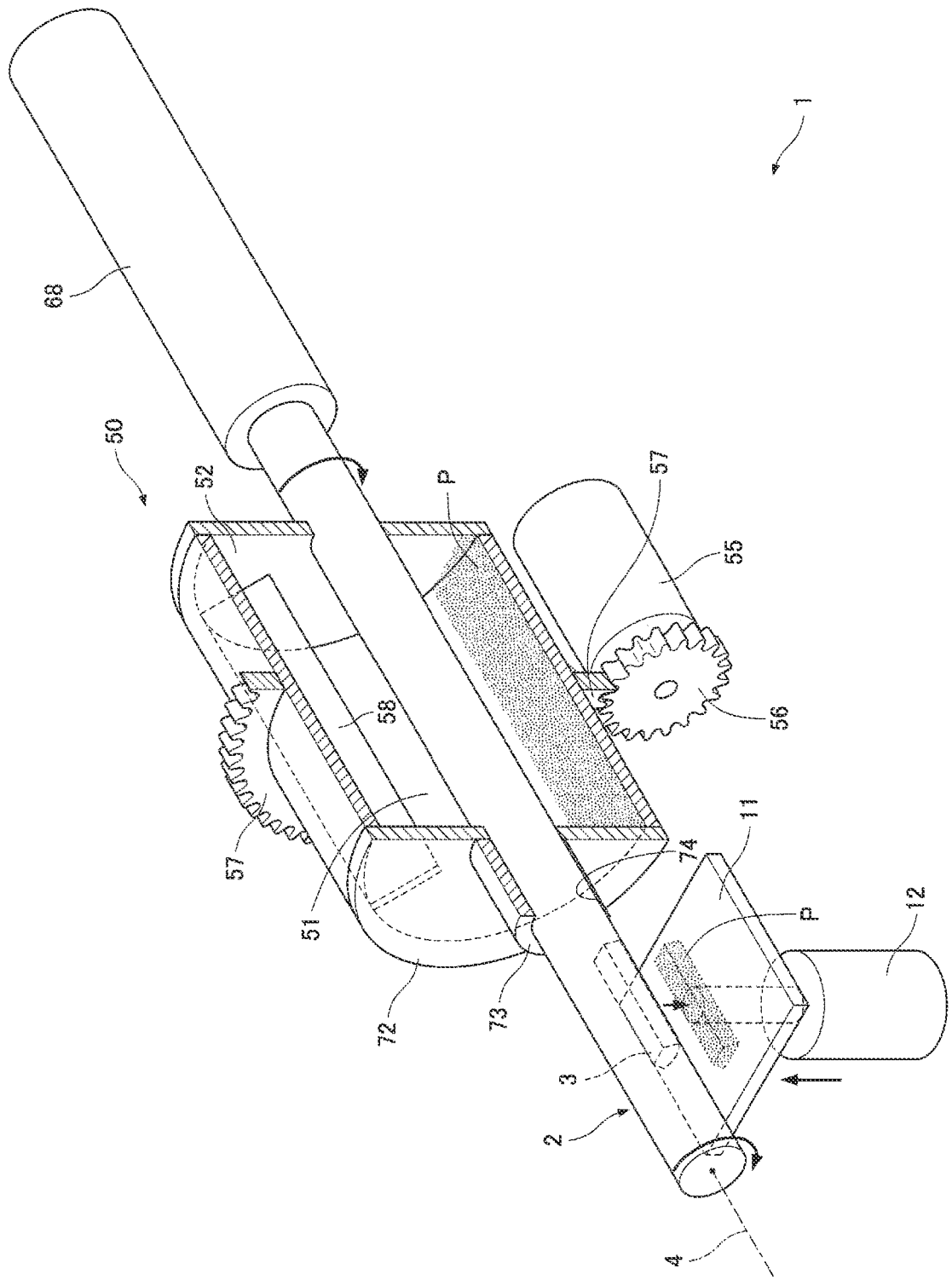
FIG. 10 is a partially cut perspective view illustrating the powder supply apparatus, in which the leveled powder in the recess is supplied downward due to a drop of the powder.
Figure 11:
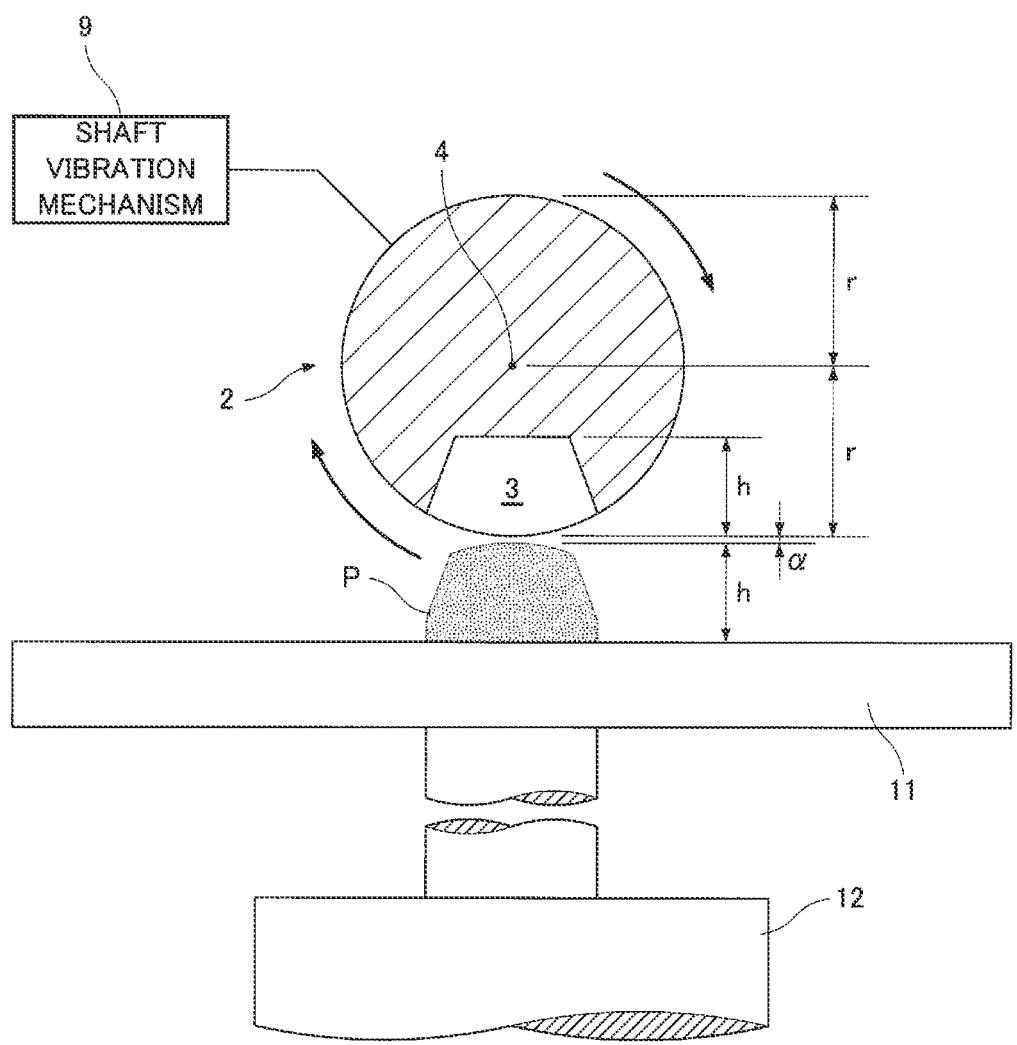
FIG. 11 illustrates a cross section of the measuring shaft and another configuration.

Referring to FIGS. 4 to 11, the configurations of the powder supply apparatus 1 will be specifically described below. FIG. 4 is a plan view of the measuring shaft 2, FIG. 5 is a cross-sectional view taken along line A-A of FIG. 4, and FIG. 6 is a partially cut perspective view of the powder supply apparatus 1. FIGS. 7 and 8 are cross-sectional views of the powder filling mechanism 5, FIGS. and 10 are partially cut perspective views of the powder supply apparatus 1, and FIG. 11 illustrates a cross section of the measuring shaft 2 and another configuration.

[Measuring Shaft 2]

As illustrated in FIG. 4, the recess 3 of the measuring shaft 2 is, for example, rectangular in plan view. The rectangular shape is preferably extended with a ratio of about 1:20 to 1:40 between the short side and the long side. This is because the extended recess 3 in plan view causes the powder P supplied from the recess 3 to extend like the recess 3 in plan view, so that the supplied powder P is suitably shaped to be spread by a squeegee or the like in a downstream process. In other words, this is because the powder P can be evenly supplied along the width direction of a squeegee or the like. The recess 3 is not always rectangular in plan view and may have any other shapes like an ellipse or an oval.

As illustrated in FIG. 5, the recess 3 of the measuring shaft 2 is an opening with sides 32 and a bottom 33. An angle θ formed between the side 32 and the bottom 33 of the recess 3 is preferably an obtuse angle. If the angle θ is an obtuse angle, the powder P easily falls from the recess 3 facing downward. If the powder P easily falls from the recess 3 facing downward, the powder P is hardly left in the recess 3 facing downward, so that even a fixed trace amount of the powder P can be supplied. The bottom 33 of the recess 3 is preferably shallower than the axis 4 of the measuring shaft 2 (h<r). This is because the bottom 33 at a lesser depth causes the powder P in the recess 3 to receive a centrifugal force applied from the measuring shaft 2 rotated by the axial rotation mechanism 8 and the powder P easily falls from the recess 3 facing downward.

[Powder Filling Mechanism 5]

As illustrated in FIG. 6, the powder filling mechanism 5 includes, for example, a cylinder 50 in which the recess 3 of the measuring shaft 2 can be placed. The powder P is placed in the cylinder 50. In FIG. 6 (also in FIGS. 9 and 10 described later), the illustrated cylinder 50 is cut in half lengthwise to indicate the inside of the cylinder 50. Furthermore, the powder filling mechanism 5 includes, for example, a cylinder rotation mechanism 54 for rotating the cylinder 50. The cylinder rotation mechanism 54 rotates the cylinder 50 so as to agitate the powder P, and then the agitated powder P fills the recess 3. The cylinder rotation mechanism 54 includes, for example, a driving gear 56 connected to the output shaft of a motor 55 and a driven gear 57 that is engaged with the driving gear 56 and is attached to the outer surface of the cylinder 50.

As illustrated in FIGS. 6 and 7, the powder filling mechanism 5 further includes, for example, powder agitator blades 58 projecting from the inner surface of the cylinder 50. The powder agitator blades 58 accelerate the agitation of the powder P in the cylinder 50 in response to a rotation of the cylinder 50. The acceleration of the agitation of the powder P smashes clumps of the powder P, so that even a fixed trace amount of the powder P can be supplied. As illustrated in FIG. 7, the multiple (two in the example of FIG. 7) powder agitator blades 58 are preferably provided to further accelerate agitation. The blades are more preferably disposed at regular intervals. In this configuration, at least one of the powder agitator blades 58 preferably has a length such that a tip of the one of the powder agitator blades 58 is separated from the measuring shaft 2 by only a small distance (d) (that is, the long powder agitator blade 58). This configuration allows the long powder agitator blade 58 to rotate to level off the powder P that fills the recess 3 and protrudes from the outer surface of the measuring shaft 2, so that the recess 3 is stably filled with the powder P. The distance (d) between the long powder agitator blade 58 and the measuring shaft 2 is preferably equal to or smaller than a depth (h) of the recess 3. The cylinder 50 may be circular or polygonal (square in the example of FIG. 8) in cross section. As illustrated in FIG. 8, the cylinder 50 shaped like a polygon, e.g., a square in cross section easily transports the powder P upward from a corner of the cylinder 50 in response to a rotation of the cylinder 50, thereby accelerating the agitation of the powder P. The powder filling mechanism 5 includes, for example, an air blowing unit 59 that agitates the powder P by blowing air a in the cylinder 50. The cylinder 50, in which the air blowing unit 59 blows the air a, may have any shapes in addition to a square in cross section in FIG. 8.

[Slide Mechanism 6 and Axial Rotation Mechanism 8]

As illustrated in FIGS. 9 and 10, the powder supply apparatus 1 includes a rotary cylinder 68 that slides the measuring shaft 2 along the axis 4 and rotates the measuring shaft 2 about the axis 4. In other words, the rotary cylinder 68 acts as the slide mechanism 6 and the axial rotation mechanism 8.

[Leveling Member 7]

As illustrated in FIGS. 9 and 10, the cylinder 50 includes a body 51, a proximal-end cover plate 52 that is disposed on one end of the body 51 and through which the proximal end of the measuring shaft 2 penetrates, a distal-end cover plate 72 that is disposed on the other end of the body 51 and through which the distal end of the measuring shaft 2 is allowed to penetrate, and a boss member 73 that is provided on the outer surface of the distal-end cover plate 72 and through which the distal end of the measuring shaft 2 is allowed to penetrate. A shaft through hole 74 formed in the distal-end cover plate 72 and the boss member 73 is a space for guiding the recess 3 of the measuring shaft 2 from the inside to the outside of the cylinder 50 by a slide of the measuring shaft 2. In other words, the distal-end cover plate 72 and the boss member 73 that have the shaft through hole 74 correspond to the leveling member 7. If the distal-end cover plate 72 and the boss member 73 are not integrated but are provided as different members, the powder P in the recess 3 is actually leveled off by the distal-end cover plate 72 facing the inside of the cylinder 50. Thus, the distal-end cover plate 72 corresponds to the leveling member 7. The cross section of the shaft through hole 74 is preferably as large as or slightly larger than the cross section of the measuring shaft 2 (for example, by a tolerance). The shaft through hole 74 configured thus reduces variations in the amount of the powder P that is leveled off and left in the recess 3. By reducing variations in the amount of the powder P that is leveled off and left in the recess 3, even a fixed trace amount of the powder P can be supplied.

[Other Configurations]

As illustrated in FIGS. 10 and 11, a lifting plate 11 may be provided as the predetermined position 10 where the dropped powder P is supplied from the recess 3, and a lifting cylinder 12 may be provided to lift and lower the lifting plate 11. As illustrated in FIG. 11, the lifting cylinder 12 can lift the lifting plate 11 to a proper height of the lifting plate 11 when the powder P is supplied from the recess 3. In this configuration, the height of the lifting plate 11 is preferably set such that a distance (h+α) between the lower end of the measuring shaft 2 and a surface on which the powder P is supplied from the recess 3 is larger than a depth (h) of the recess 3 by a small distance (α). This is because the height can minimize a drop height (h+α) of the powder P dropped from the recess 3, so that the supplied powder P is not deformed by the drop and is suitably shaped to be spread by a squeegee or the like in a downstream process.

As illustrated in FIG. 11, a shaft vibration mechanism 9 for vibrating the measuring shaft 2 may be provided. The shaft vibration mechanism 9 facilitates the drop of the powder P from the recess 3 by vibrating the measuring shaft 2 with the recess 3 facing downward.

A method of using the powder supply apparatus 1 will be specifically described below.

First, as illustrated in FIGS. 6 and 7, the cylinder 50 is rotated by the cylinder rotation mechanism 54. The powder P disposed in the cylinder 50 is agitated by the rotation. The agitated powder P rises above the recess 3 of the measuring shaft 2, so that the recess 3 is filled with the powder P.

Subsequently, when the powder P filling the recess 3 protrudes therefrom, the measuring shaft 2 is slid by the rotary cylinder 68 as illustrated in FIG. 9. A time when the powder P filling the recess 3 protrudes therefrom can be estimated from the number of revolutions or the time of revolution of the cylinder 50. When the number of revolutions or the time of revolution is reached, the measuring shaft 2 may be automatically slid by the rotary cylinder 68. The slide of the measuring shaft 2 moves the recess 3 from the inside to the outside of the cylinder 50 through the shaft through hole 74. When the recess 3 passes through the shaft through hole 74, the powder P protruding from the recess 3 is leveled off. Thus, the recess 3 moves out of the cylinder 50 while the powder P filling the recess 3 is leveled off.

Thereafter, as illustrated in FIGS. 10 and 11, the lifting plate 11 is lifted by the lifting cylinder 12. Specifically, as illustrated in FIG. 11, the lifting plate 11 is lifted to the preferable height. The rotary cylinder 68 rotates the measuring shaft 2 about the axis 4 so as to direct the recess 3 downward. When the recess 3 moves out of the cylinder 50 and the lifting plate 11 reaches the preferable position, the measuring shaft 2 may be automatically rotated about the axis 4 by the rotary cylinder 68. The powder P drops to the lifting plate 11 from the recess 3 facing downward, so that the powder P is supplied to the lifting plate 11. In order to facilitate the drop, the shaft vibration mechanism 9 vibrates the measuring shaft 2 with the recess 3 facing downward.

In this way, the powder supply apparatus 1 supplies the powder P leveled off by the leveling member 7, so that even a fixed trace amount of the powder P can be supplied. Moreover, the powder P is supplied from the recess 3 after being slid from a position for filling the recess 3 with the powder P, thereby securing a space above the predetermined position 10 for supplying the powder P.

Moreover, the cylinder 50 with the powder P disposed therein is rotated by the cylinder rotation mechanism 54, thereby agitating the powder P in the cylinder 50 so as to smash clumps of the powder P. Thus, even a fixed trace amount of the powder P can be supplied. Furthermore, the cylinder 50 with the powder P disposed therein is rotated by the cylinder rotation mechanism 54, allowing estimation of a time when the recess 3 is filled with the powder P. Thus, the configuration can be suitable for automation.

Additionally, the agitation of the powder P is accelerated by the powder agitator blades 58 and the air blowing unit 59 in the cylinder 50 so as to further smash clumps of the powder P. Thus, even a fixed trace amount of the powder P can be supplied.

Moreover, the leveling member 7 is a member (distal-end cover plate 72) constituting the cylinder 50, achieving a simple configuration.

The shaft vibration mechanism 9 vibrating the measuring shaft 2 easily drops the powder P from the recess 3 facing downward, so that even a fixed trace amount of the powder P can be supplied.

The powder P is not specifically described in the present embodiment. The powder P may be any powder and is not limited. The preferable powder P supplied in the powder supply apparatus 1 is spread by a squeegee or the like in a downstream process and then is formed into a solid material under a high pressure.

In the foregoing embodiment, only the measuring shaft 2 circular in cross section is illustrated. The measuring shaft 2 may have other shapes such as a polygon.

Figure 12:
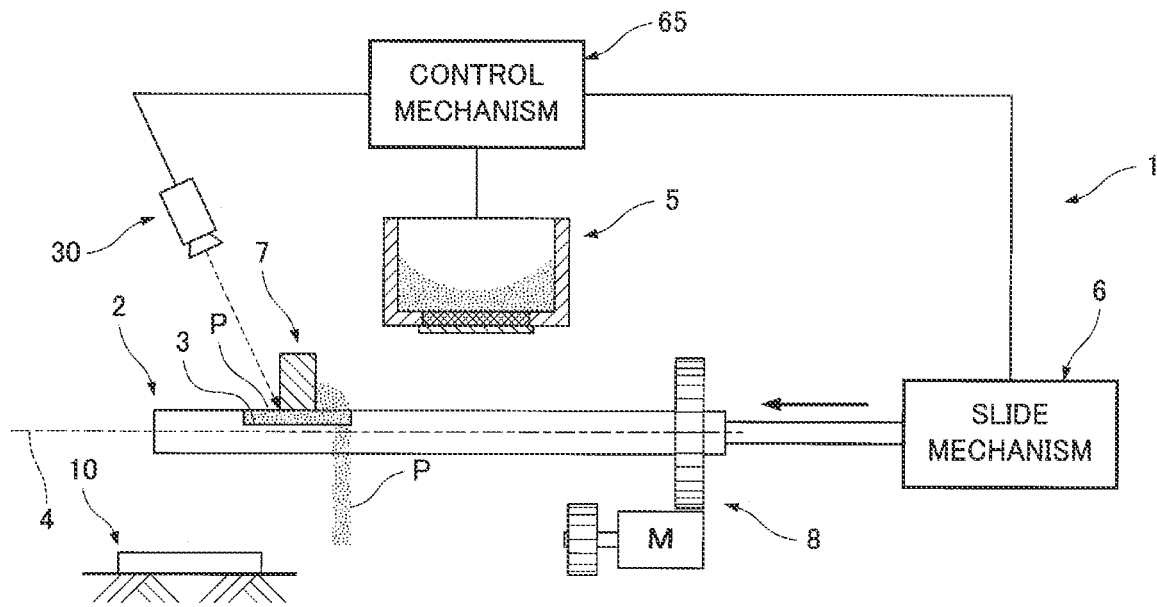
FIG. 12 is a schematic side view illustrating the powder supply apparatus including a detector and a controller, in which leveled powder is detected.
Figure 13:
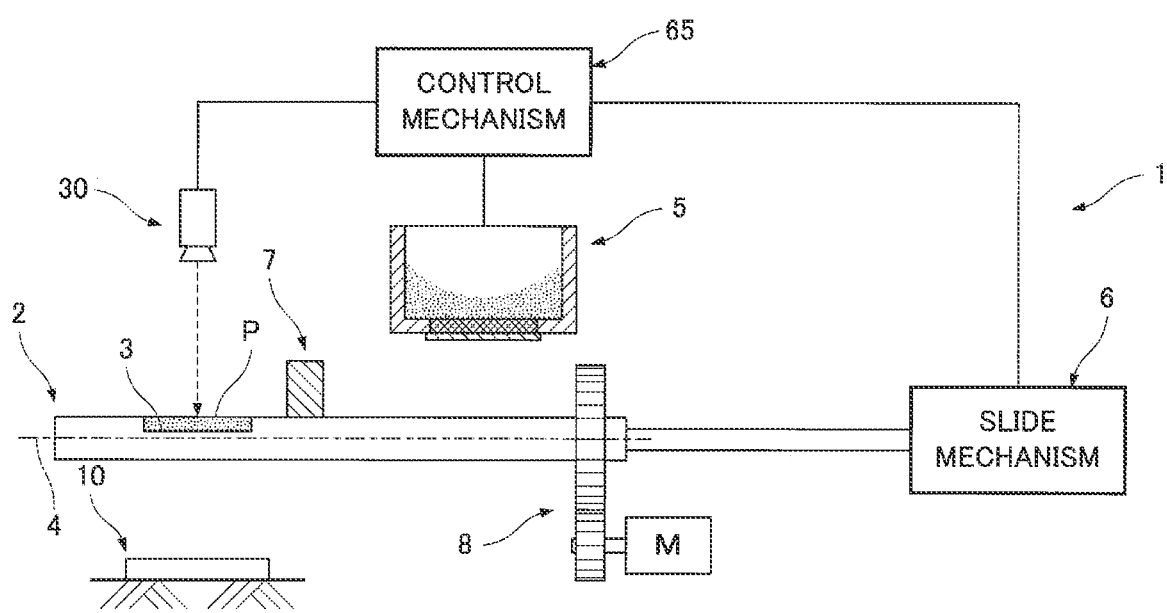
FIG. 13 is a schematic side view illustrating the powder supply apparatus with the reoriented detector, in which powder is detected immediately before being supplied.

A filling state is preferably confirmed before the leveled powder P is supplied downward, though the confirmation is not described in the foregoing embodiment. The confirmation may be a visual check but is preferably made by devices in view of reliability and automation. As illustrated in FIGS. 12 and 13, configurations necessary for the confirmation by devices are a detector 30 and a control mechanism 65. The detector 30 detects a filling state of the powder P in the recess 3 after the powder P is leveled off by the leveling member 7. Specifically, the detector 30 is, for example, a laser measuring machine or a camera (image detection) that measures the shape of the recess 3 or recognizes a state of filling of the recess 3 with the powder P. If the detector 30 detects an insufficient filling state, the control mechanism 65 causes the slide mechanism 6 to slide the measuring shaft 2 to a position for filling (refilling) the recess 3 with the powder P and causes the powder filling mechanism 5 to fill (refill) the recess 3 with the powder P. The insufficient filling state means that a necessary amount of the powder P for being supplied fixedly has not filled the recess 3. The control mechanism 65 is specifically, for example, a control panel including a determination unit for determining whether a filling state detected by the detector 30 is insufficient or not, and an instruction unit for providing instructions for the powder filling mechanism 5 and the slide mechanism 6. The detector 30 in FIG. 12 is oriented to detect a filling state of the powder P leveled off by the leveling member 7. Thus, in the case of an insufficient filling state of the leveled powder P, the control mechanism 65 immediately refills the recess 3 with the powder P, thereby shortening a time for supplying a fixed amount of the powder P. The detector 30 in FIG. 13 is oriented to detect a filling state of the powder P immediately before the powder P is supplied downward. This can reliably supply a fixed amount of the powder P. The powder supply apparatus 1 may be provided with both of the detector 30 in FIG. 12 and the detector 30 in FIG. 13.

Furthermore, the foregoing embodiment is merely exemplary and is not restrictive in all the aspects. The scope of the present invention is not indicated by the foregoing description but the claims. The scope of the present invention is intended to include meanings equivalent to the claims and all changes in the scope. From among the configurations described in the embodiment, the configurations other than those described as a first invention in "Solution to Problem" are optional and thus can be deleted and changed as appropriate.

The invention claimed is:

1. A powder supply apparatus comprising:
   a measuring shaft having a recess to be filled with powder;
   a powder filling mechanism for filling the recess of the measuring shaft with the powder;
   a slide mechanism for sliding the measuring shaft along an axis of the measuring shaft;
   a leveling member for leveling off the powder in the recess by a slide of the measuring shaft; and
   an axial rotation mechanism that directs the recess downward by rotating the measuring shaft about the axis of the measuring shaft and supplies the leveled powder in the recess downward from the recess by dropping the powder,
   wherein the powder filling mechanism includes:
      a cylinder in which at least the recess of the measuring shaft is allowed to be placed and the powder is disposed; and
      a cylinder rotation mechanism that rotates the cylinder so as to agitate the powder in the cylinder and fill the recess with the powder.

2. The powder supply apparatus according to claim 1, wherein the powder filling mechanism further includes a powder agitator blade projecting from an inner surface of the cylinder.

3. The powder supply apparatus according to claim 1, wherein the powder filling mechanism further includes an air blowing unit that agitates the powder by blowing air in the cylinder.

4. The powder supply apparatus according to claim 1, wherein the leveling member is a member having a shaft through hole for guiding the recess of the measuring shaft from inside to outside of the cylinder by the slide of the measuring shaft.

5. The powder supply apparatus according to claim 1, further comprising a shaft vibration mechanism for facilitating the drop of the powder from the recess facing downward by vibrations.

6. A powder supply apparatus comprising:
   a measuring shaft having a recess to be filled with powder;
   a powder filling mechanism for filling the recess of the measuring shaft with the powder;
   a slide mechanism for sliding the measuring shaft along an axis of the measuring shaft;
   a leveling member for leveling off the powder in the recess by a slide of the measuring shaft; and
   an axial rotation mechanism that directs the recess downward by rotating the measuring shaft about the axis of the measuring shaft and supplies the leveled powder in the recess downward from the recess by dropping the powder,
   further comprising a detector for detecting a filling state of the powder in the recess after the powder is leveled off by the leveling member; and
   a control mechanism that causes the slide mechanism to slide the measuring shaft to a position for filling the recess with the powder and causes the powder filling mechanism to fill the recess with the powder if the detector detects an insufficient filling state of the powder.

7. The powder supply apparatus according to claim 1, further comprising a detector configured to detect a filling state of the powder in the recess after the powder is leveled off by the leveling member; and
    a control mechanism configured to cause the slide mechanism to slide the measuring shaft to a position for filling the recess with the powder and cause the powder filling mechanism to fill the recess with the powder if the detector detects an insufficient filling state of the powder.

8. The powder supply apparatus according to claim 6, further comprising a shaft vibration mechanism configured to facilitate the drop of the powder from the recess facing downward by vibrations.

\* \* \* \* \*